US011561678B1

(12) United States Patent
Shang et al.

(10) Patent No.: US 11,561,678 B1
(45) Date of Patent: Jan. 24, 2023

(54) AUTOMATIC ZOOM ON DEVICE SCREEN TO IMPROVE ARTIFICIAL INTELLIGENCE IDENTIFICATION RATE

(71) Applicant: MICRO FOCUS LLC, Santa Clara, CA (US)

(72) Inventors: Er-Xin Shang, Shanghai (CN); Shuhui Fu, Shanghai (CN); Yun Yuan, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/513,718

(22) Filed: Oct. 28, 2021

(51) Int. Cl.
 G06F 3/0482 (2013.01)
 G06N 20/00 (2019.01)
 G06F 40/232 (2020.01)

(52) U.S. Cl.
 CPC .......... *G06F 3/0482* (2013.01); *G06F 40/232* (2020.01); *G06N 20/00* (2019.01); *G06F 2203/04806* (2013.01)

(58) Field of Classification Search
 CPC ...... G06F 3/0482; G06F 40/232; G06N 20/00
 See application file for complete search history.

(56) References Cited

U.S. PATENT DOCUMENTS

| 7,627,142 | B2 | 12/2009 | Kurzweil et al. | |
|---|---|---|---|---|
| 8,504,945 | B2 | 8/2013 | Jakobson et al. | |
| 8,749,587 | B2 * | 6/2014 | Chiu | G09G 5/14 |
| | | | | 345/667 |
| 8,812,978 | B2 * | 8/2014 | Eschbach | G06F 40/103 |
| | | | | 715/801 |
| 9,113,033 | B2 | 8/2015 | Junuzovic et al. | |
| 9,934,585 | B2 * | 4/2018 | Oh | G06T 7/33 |
| 10,049,350 | B2 * | 8/2018 | Smith | G06Q 20/042 |
| 10,832,411 | B2 | 11/2020 | Kim et al. | |
| 10,984,529 | B2 * | 4/2021 | Carter | G16H 50/20 |
| 11,182,936 | B2 * | 11/2021 | Zhang | G06T 11/60 |
| 2007/0150829 | A1 * | 6/2007 | Eschbach | G06F 40/103 |
| | | | | 715/781 |
| 2008/0118237 | A1 | 5/2008 | Wegenkittl et al. | |
| 2008/0212901 | A1 * | 9/2008 | Castiglia | G06V 10/987 |
| | | | | 382/311 |
| 2012/0066622 | A1 * | 3/2012 | Park | G06F 16/904 |
| | | | | 715/764 |

(Continued)

OTHER PUBLICATIONS

Dave Citron; Making Meetings More Immersive, Inclusive, and Productive with Google Meet; Google Workspace; Apr. 21, 2021; 6 pages.

*Primary Examiner* — Anil K Bhargava
(74) *Attorney, Agent, or Firm* — Sheridan Ross P.C.

(57) ABSTRACT

An image of a user interface of a device is captured. A graphical object is identified in the image of the user interface. For example, a menu item or a text object is identified in the image of the user interface. An Artificial Intelligence (AI) process is used to determine a confidence score for the graphical object; the confidence score identifies a confidence of how likely a type of the graphical object can be identified. In response to the first confidence score not meeting a threshold, a zoomed in image of the graphical object is taken or a zoomed-out image of the graphical object is taken. The zoomed in image or the zoomed-out image is used to increase the confidence score to better identify the type of the graphical object.

20 Claims, 4 Drawing Sheets

(56) References Cited

U.S. PATENT DOCUMENTS

| | | | |
|---|---|---|---|
| 2016/0210268 A1* | 7/2016 | Sales | G06F 3/04842 |
| 2016/0379186 A1* | 12/2016 | Smith | G06Q 20/0425 |
| | | | 705/45 |
| 2019/0279170 A1* | 9/2019 | Smith | G06Q 20/042 |
| 2021/0241032 A1* | 8/2021 | Wang | G06K 9/6256 |
| 2022/0044048 A1* | 2/2022 | Phatak | G06K 9/6288 |

* cited by examiner

AUTOMATIC ZOOM ON DEVICE SCREEN TO IMPROVE ARTIFICIAL INTELLIGENCE IDENTIFICATION RATE

FIELD

The disclosure relates generally to testing of graphical user interfaces in a device and particularly to using Artificial Intelligence (AI) to improve identification of graphical objects in a user interface.

BACKGROUND

Currently, the processes for using artificial intelligence for identification of graphical images has limitations. Sometimes the quality of the image does not allow an artificial intelligence system to properly identify the graphical object. Because the graphical objects cannot be properly identified, the ability to develop automated tests is limited.

SUMMARY

These and other needs are addressed by the various embodiments and configurations of the present disclosure. An image of a user interface of a device is captured. A graphical object is identified in the image of the user interface. For example, a menu item or a text object is identified in the image of the user interface. An Artificial Intelligence (AI) process is used to determine a confidence score for the graphical object; the confidence score identifies a confidence of how likely a type of the graphical object can be identified. In response to the first confidence score not meeting a threshold, a zoomed in image of the graphical object is taken or a zoomed-out image of the graphical object is taken. The zoomed in image or the zoomed-out image is used to increase the confidence score to better identify the type of the graphical object.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
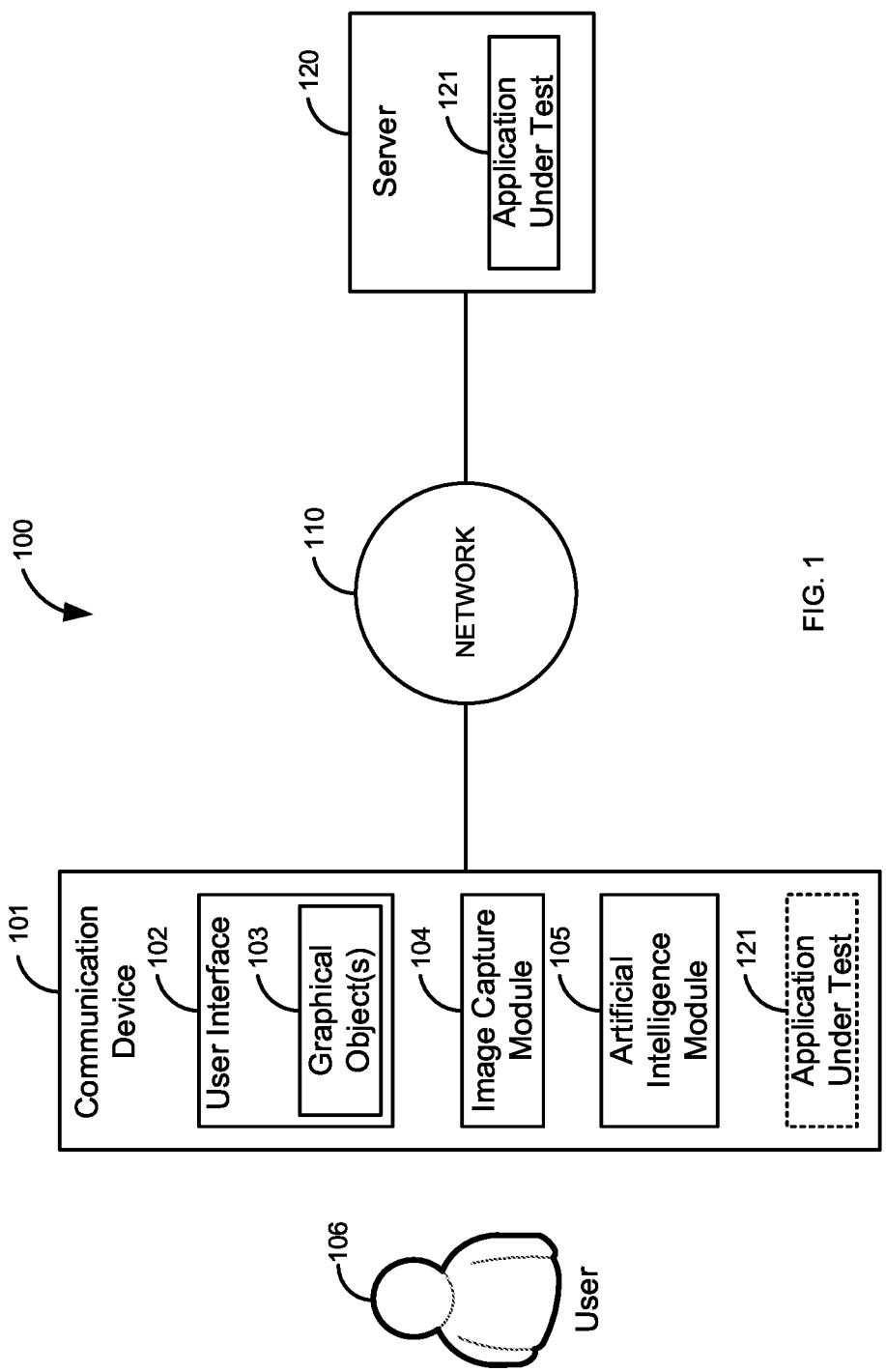
FIG. 1 is a block diagram of a first illustrative system for using automatic zoom to improve identification of graphical object(s) in a user interface.

FIG. 1 is a block diagram of a first illustrative system 100 for using automatic zoom to improve identification of graphical object(s) 103 in a user interface 102. The first illustrative system 100 comprises a communication device 101, a network 110, and a server 120. FIG. 1 also shows a user 106 for illustrative purposes.

The communication device 101 can be or may include any device that can communicate on the network 110, such as a Personal Computer (PC), a telephone, a video system, a cellular telephone, a Personal Digital Assistant (PDA), a tablet device, a notebook device, a smartphone, and/or the like. Although not shown in FIG. 1, any number of communication devices 101 may be connected to the network 110.

The communication device 101 further comprises a user interface 102, an image capture module 104, an Artificial Intelligence (AI) module 105, and optionally an Application Under Test (AUT) 121. The user interface 102 may be any type of user interface 102 that can display images generated from the AUT 121, such as, a computer monitor, a touch screen, a Light Emitting Diode (LED) display, a plasma display, and/or the like. The user interface 102 further displays the graphical object(s) 103. A graphical object 103 may be any graphical object 103 in the user interface 102, such as, a window, a text object a text field, a text area, a button, an icon, a panel, a menu, a menu item, a slider, a pane, an image, a scroll bar, and/or the like.

The image capture module 104 may be any hardware coupled with software that can capture an image of the user interface 102, such as, a camera, a program that can capture a bitmap of the user interface 102, a program that can create a user interface 102 based on code sent from the AUT 121, and/or the like. The image capture module 104 uses the captured image as an input into the Artificial Intelligence (AI) module 105 in order to identify the various types of graphical objects 103 in the user interface 102. The image capture module 104 may capture a full image of the user interface 102 and/or a subset of the user interface 102 depending on implementation.

The Artificial Intelligence (AI) module 105 can use any type of AI to identify graphical objects 103 in the user interface 102. For example, the AI module 105 may use structured learning, semi-structured learning, unstructured learning, and/or the like. The AI module 105 may use different AI algorithms based on the AUT 121 and the communication device 101. For example, a first AI algorithm may be used to test the user interface 102 of a smartphone 101 (a first type of user interface 102) interacting with AUT 121 and a second AI algorithm may be used to test the user interface 102 of a Personal Computer (PC) (a second type of user interface 102) interacting with the same AUT 121. The different AI algorithms may be fined tuned to the specific communication device 101 being used in the testing process. The AI module 105 may use training information from other user interfaces 102 to identify the graphical objects 103 in the user interface 102 (e.g., using structured machine learning).

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and/or the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The server 120 may be any type of server 120, such as, a web server, an application server, a communication server, a proxy server, an authentication server, a database server, an email server, and/or the like. The server 120 further comprises the AUT 121. The AUT 121 can be any application, such as, a web application, an email application, a chat application, a retail application, a security application, a networked application, a communication application, a database application, an embedded application, a word processing application, a graphical editor application, a spreadsheet application, a human resource application, a financial application, a gaming application, and/or the like. In one embodiment, the AUT 121 may reside on the communication device 101 instead of the AUT 121 being on the server 120.

Figure 2:
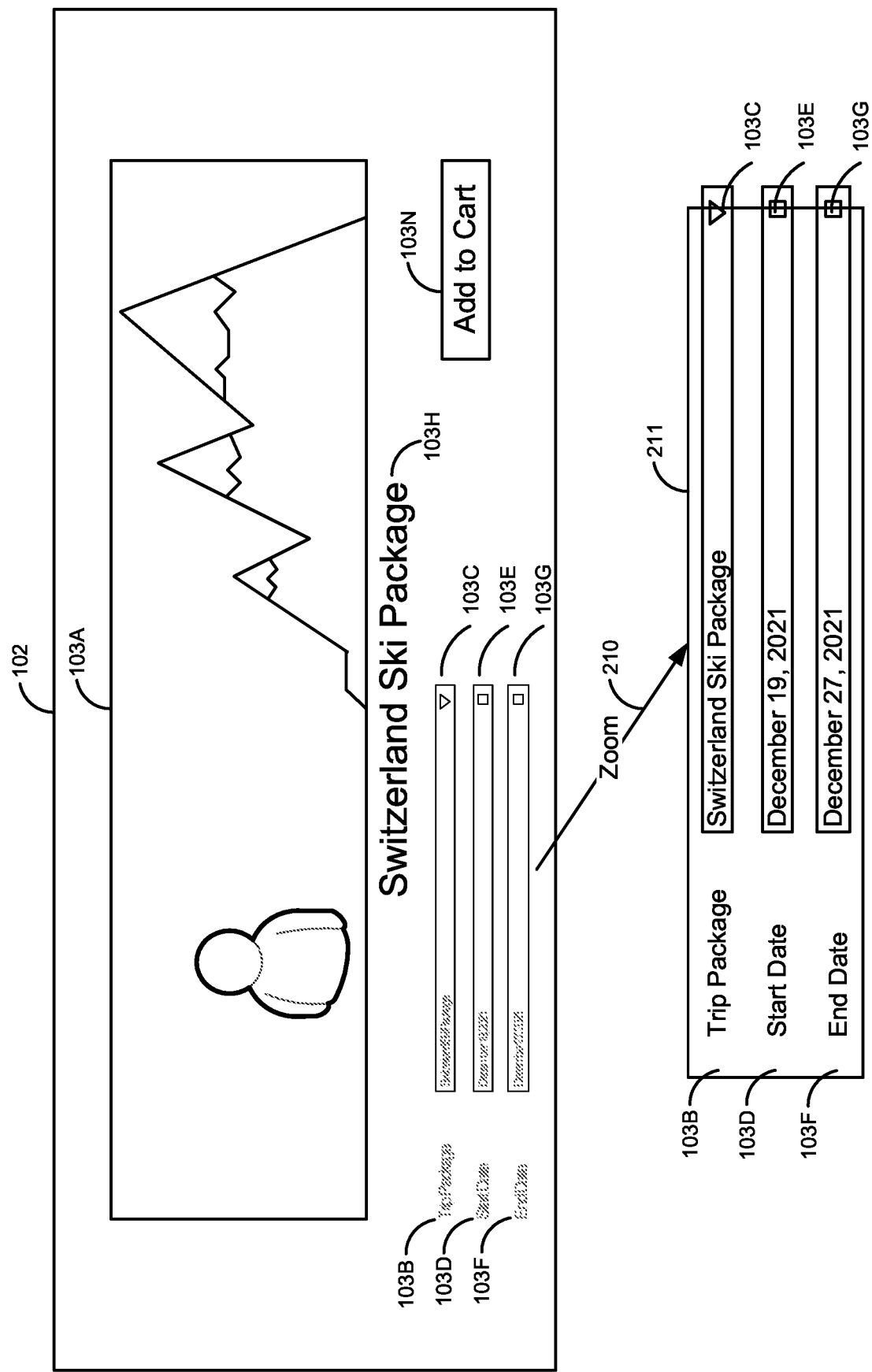
FIG. 2 is a diagram of zooming in on a graphical object(s) to improve identification of the graphical object(s) in a user interface.

FIG. 2 is a diagram of zooming in on a graphical object(s) 103 to improve identification of the graphical object(s) 103 in a user interface 102. FIG. 2 comprises the user interface 102 and a zoom in area 211.

The user interface 102 comprises graphical objects 103A-103N where N may be any number of graphical objects 103. The graphical object 103A is an image object of a person and mountains. The graphical object 103B is a text object with the text "Trip Package." The graphical object 103C is a menu object where the user 106 has selected the "Switzerland Ski Package." The graphical object 103D is a text object with the text "Start Date." The graphical object 103E is a text field where the user 106 can enter a start date. The graphical object 103F is a text object with the text "End Date." The graphical object 103G is a text field where the user 106 can enter an end date. The graphical object 103H is a text object with the text "Switzerland Ski Package." The graphical object 103N is a button object with the text "Add to Cart" that is within the graphical object 103N. Although not shown other types of graphical objects 103 may reside in the user interface 102.

In FIG. 2, the font size for the graphical objects 103B-103G is much smaller than the font size for the graphical objects 103H-103N. Depending upon the AI algorithm, different/smaller font sizes (or different types of fonts) may cause the AI module 105 to not properly identify some of the graphical objects 103. In addition, because of the smaller size of the graphical objects 103B-103G, the type of graphical object 103 may also be more difficult to identify (e.g., whether the graphical object 103 is a text object, a text field, or a menu item). On the other hand, the graphical objects 103H-103N can be more easily identified because of the larger font size/size of the graphical object 103H-103N.

Based on the size/text the AI module 105 may not be able identify the graphical objects 103B-103G or a type for these graphical objects 103B-103G. The AI module 105 generates a confidence score when identifying the graphical object 103 and the type of the graphical object 103. A confidence score is how likely a graphical object 103 is a type of object (e.g., a text object, a button, etc.). The confidence score is generated based on various factors, such as text (e.g., the text "Add to Cart" is learned for button objects), learned images (e.g., a menu item has certain characteristics), a shape of the object, images within the object (e.g., graphical object 103C has an upside-down triangle, which indicates it is a menu object), and/or the like. In FIG. 2, the generated confidence score for the graphical objects 103B-103G is much lower than the confidence score for the graphical objects 103A and 103H-103N because of the small font size and size of the graphical objects 103B-103G in the graphical user interface 102.

Although not shown, the same problem may exist where the type of font used (e.g., Times New Roman versus Calibri) may cause the AI algorithm to generate a lower/higher confidence score. In addition, other factors, such as bold, italics, color, language, etc. may also be factors in determining the confidence score.

The help alleviate this problem, the AI module 105 identifies the zoom area 211 in step 210. In FIG. 2, the zoom area is an identified rectangle (e.g., a bounding box) that contains the graphical objects 103B-103G, which have a low confidence score. The process is not limited to a rectangle, but may use other shapes, such as, a circle, a triangle, a non-linear shape, and/or the like. The image capture module 104 then zooms in using the zoom area 211 to create a higher resolution image of the zoom area. Using the zoom area 211, the AI module 105 can now properly identify the graphical objects 103B-103G. As a result, a higher confidence score is generated by the AI algorithm.

Although FIG. 2 is shown as identifying a group of graphical objects 103B-103G in the zoom area 211, a single graphical object 103 may be in the zoom area 211. In addition, the AI module 105 may identify multiple zoom areas 211 in the user interface 102 that contain one or more graphical objects 103 that have a low confidence score. The zoom in/zoom out areas 211 may vary depending on the layout of the user interface 102, fonts, font size, colors, graphical object size, backgrounds, line width, fill, and/or the like.

Although not shown in FIG. 2, a similar process may be used to zoom out. In this embodiment, the zoom area 211 may be a zoomed-out image. For example, if the text object 103H was too large for the AI module 105 to properly identify (e.g., the text characters are too large for the AI module 105 to properly identify), the AI module 105 may instruct the image capture module 104 to zoom out the zoom area 211 of the graphical user interface 102 so the text/graphical object 103 can be properly identified.

Figure 3:
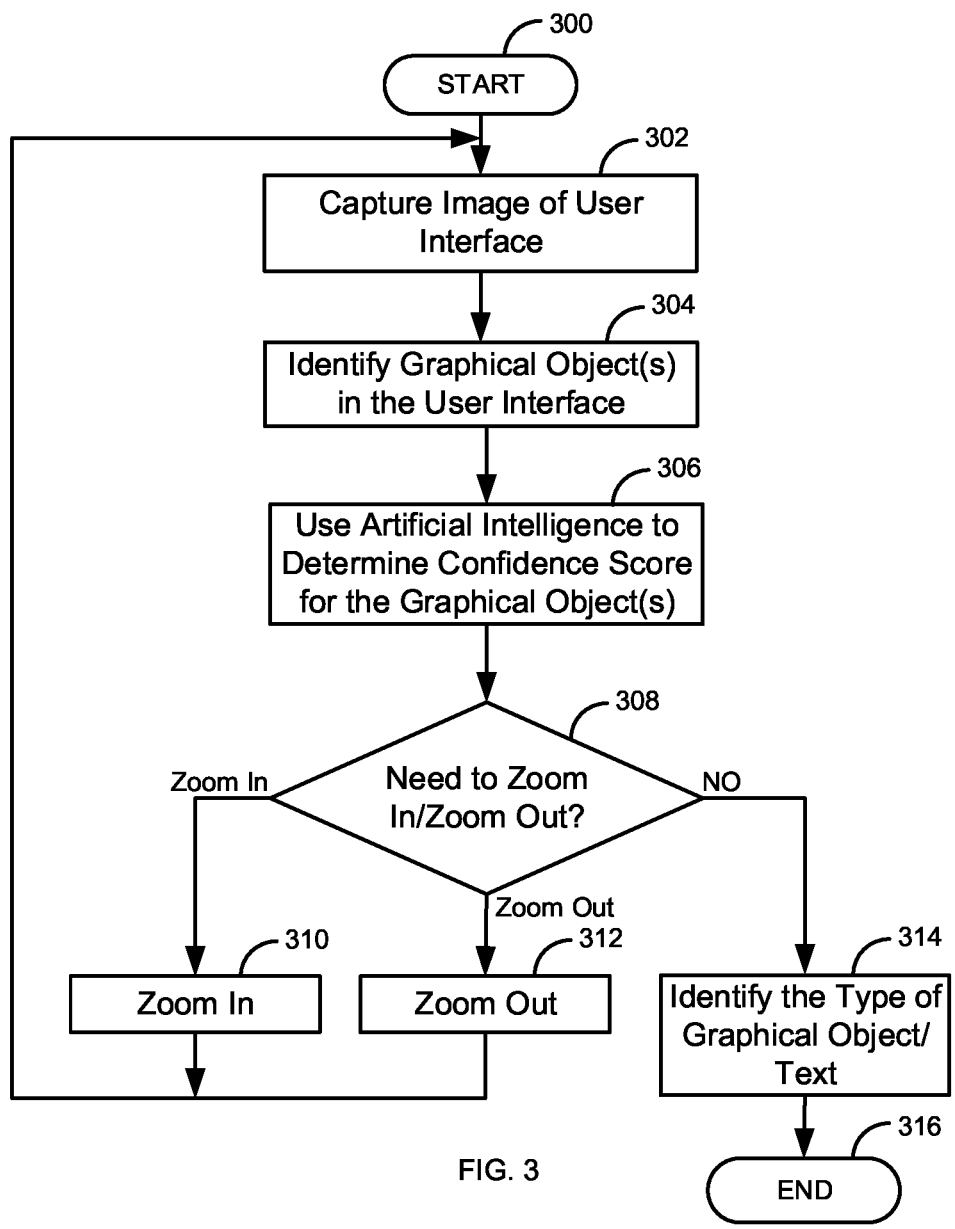
FIG. 3 is a flow diagram of a process for using automatic zoom to improve identification of graphical object(s) in a user interface.
Figure 4:
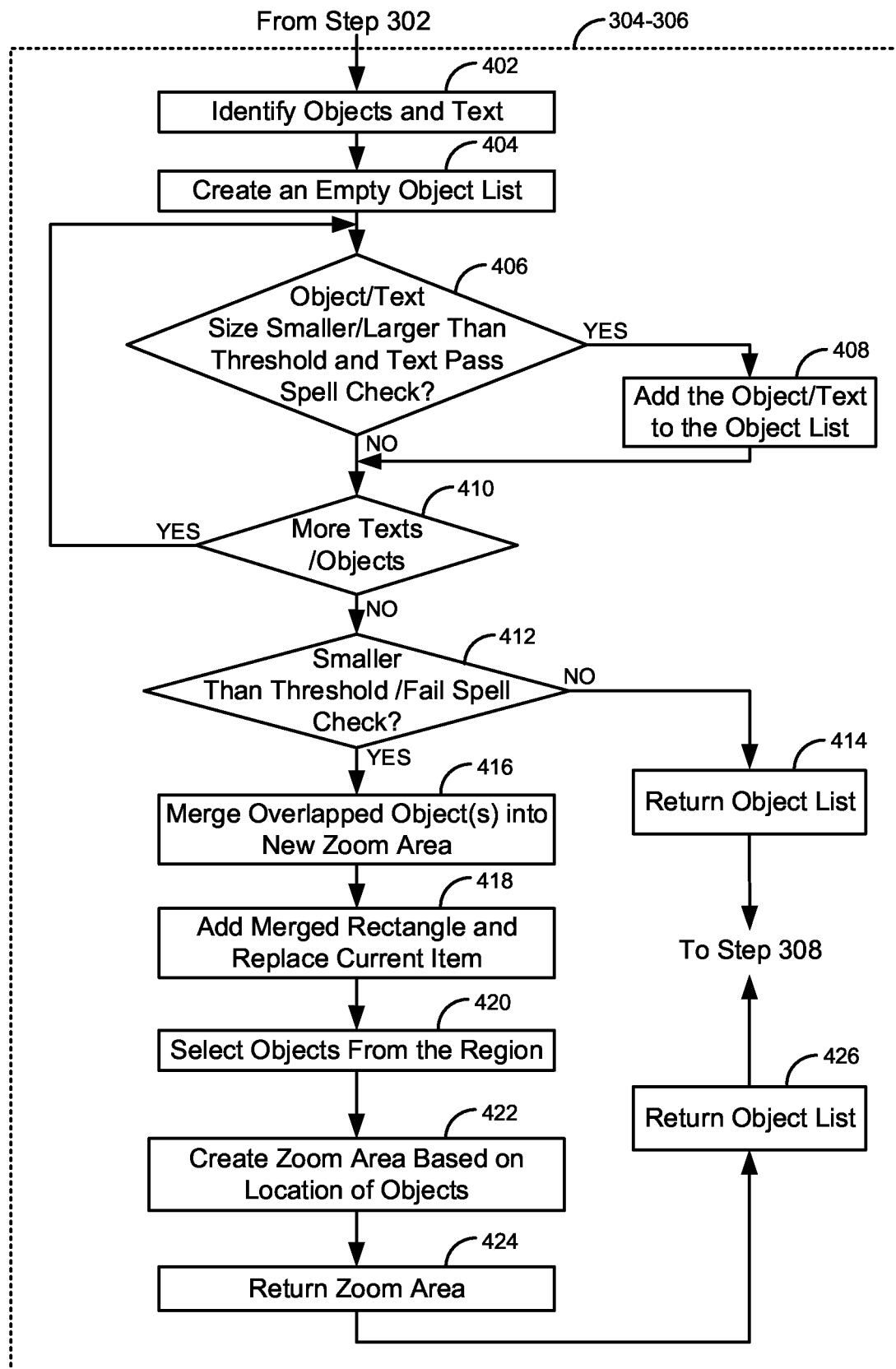
FIG. 4 is a flow diagram of a process for identifying a zoom location to improve identification of graphical object(s) in a user interface.

FIG. 3 is a flow diagram of a process for using automatic zoom to improve identification of graphical object(s) 103 in a user interface 102. Illustratively, the communication device 101, the user interface 102, image capture module 104, the AI module 105, the server 120, and the AUT 121 are stored-program-controlled entities, such as a computer or microprocessor, which performs the method of FIGS. 3-4 and the processes described herein by executing program instructions stored in a computer readable storage medium, such as a memory (i.e., a computer memory, a hard disk, and/or the like). Although the methods described in FIGS. 3-4 are shown in a specific order, one of skill in the art would recognize that the steps in FIGS. 3-4 may be implemented in different orders and/or be implemented in a multi-threaded environment. Moreover, various steps may be omitted or added based on implementation.

The process starts in step 300. The image capture module 104 captures an image of the user interface 102 in step 302. The AI module 105 identifies, in step 304, the graphical objects 103 in the user interface 102. The AI module 105 uses AI to determine a confidence score for the graphical objects 103 in step 306. For example, as discussed in FIG. 2, the AI module 105 may identify the graphical objects 103A-103N. If the confidence score for a graphical object 103 (or a group of graphical objects 103) is below a threshold, the AI module 105 determines, in step 306, whether there is a need to zoom in or zoom out. If there is a need to zoom in step 308, the image capture module 104 zooms in in step 310. The image capture module 104 then captures a zoomed in image of the zoom area 211 in step 310. The process then repeats for the image of the zoom area 211 in step 302. If there is a need to zoom out in step 308, the image capture module 104 zooms out in step 312. The image capture module 104 then captures a zoomed-out image of the zoom area 211 in step 302. The process then repeats for the image of the zoom area 211.

If there is not a need to zoom in or zoom out in step 308, the AI module 105 identifies the type of the graphical object(s) 103/text in step 314. The process then ends in step 316.

The process of FIG. 3 may be repeated for each graphical object 103 in the user interface 102. The process of FIG. 3 may determine the types of graphical objects 103 in parallel (e.g., using one or more threads). For example, as shown in FIG. 2, the AI module 105 can identify the individual graphical objects 103A and 103H-103N without zooming in. The AI module 105 then identifies the graphical objects 103B-103G by zooming in.

FIG. 4 is a flow diagram of a process for identifying a zoom location to improve identification of graphical object(s) 103 in a user interface 102. FIG. 4 is an exemplary embodiment of steps 304-306 of FIG. 3.

After capturing the image of the user interface 102 in step 302, the AI module 105 identifies the graphical object(s) 103 and text associated with the graphical object(s) 103 in step 402. The text associated with the graphical object 103 may be by the graphical object 102 and/or within the graphical object 103. The AI module 105 creates an empty object list in step 404. The object list is for storing information about the identified graphical objects 103. The AI module 105 determines, in step 406, if the size of the graphical object 103/text is smaller/larger than a threshold and if the text passes a spell check (smaller for zoom in and larger for zoom out). For example, if the confidence score is below the threshold (e.g., the size of graphical object 103 is too small and the text within the graphical object 103 fails the spell check), then the graphical object 103 cannot be identified. If the confidence score of the graphical object 103 meets the threshold and the text passes the spell check in step 406, the AI module 105 adds the graphical object 103/text to the object list in step 408. The process then goes to step 410.

If the graphical object 103 size/text size is not smaller/larger than the threshold and the spell check passes in step 406, the AI module 105 determines, in step 410, if there are more texts/graphical objects 103 in the image of the user interface 102. If there are more texts/graphical objects 103 in step 410, the process goes back to step 406 to process the next graphical object 103.

Otherwise, if there are no more texts/graphical objects 103 in step 410, the AI module 105 determines, in step 412, if were any graphical objects 103 sizes/text sizes that were smaller/larger than the threshold/failed the spell check of step 406. If there were not any graphical objects 103/text sizes that were smaller/larger than the threshold/did not fail the spell check in step 412, the process returns the object list in step 414 and then goes to step 308.

If there are graphical objects 103/text sizes that were smaller/larger than the threshold/filed the spell check in step 412, the AI module 105 merges overlapped graphical objects 103 into a new zoom area 211 in step 416. The AI module 105 add the merged rectangle and replaces the current item in step 418. Step 418 is for identifying overlapped graphical objects 103. For example, if graphical objects 103B and 103C overlap, the two zoom areas 211 will be merged into a single zoom area 211. The AI module 105 selects the graphical objects 103 from the region in step 420. The AI module 105 creates a zoom area 211 based on the location of the graphical objects 103 in the region in step 422. The AI module 105 then returns the zoom area 211 in step 424. The AI module 105 then returns the region object in step 426. The process then goes to step 308.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on the server 120 or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
    a microprocessor; and
    a computer readable medium, coupled with the microprocessor and comprising microprocessor readable and executable instructions that, when executed by the microprocessor, cause the microprocessor to:
    determine a type of user interface for different types of devices;
    capture a first image of a user interface for one of the different types of devices;
    identify, from the first image of the user interface, a graphical object in the user interface;
    use a first Artificial Intelligence (AI) process to determine a first confidence score for the graphical object, wherein the first confidence score identifies a confidence of how likely a type of the graphical object can be identified;
    select the first AI process from a plurality of AI processes based on the type of user interface for the different types of devices;
    in response to the first confidence score not meeting a threshold, doing at least one of:
    zoom in on the graphical object; and
    zoom out from the graphical object.

2. The system of claim 1, wherein zooming in on the graphical object is completed and wherein the microprocessor readable and executable instructions further cause the microprocessor to:
    capture a second image of the user interface, where the captured second image is a zoomed in image of the graphical object;
    use the first AI process to determine a second confidence score for the graphical object, wherein the second confidence score identifies a confidence of how likely the graphical object can be properly identified and wherein the second confidence score meets the threshold; and
    identify the type of the graphical object.

3. The system of claim 1, wherein zooming out on the graphical object is completed and wherein the microprocessor readable and executable instructions further cause the microprocessor to:
    capture a second image of the user interface, where the captured second image is a zoomed-out image of the graphical object;
    use the first AI process to determine a second confidence score for the graphical object, wherein the second confidence score identifies a confidence of how likely the graphical object can be properly identified and wherein the second confidence score meets the threshold; and identify the type of the graphical object.

4. The system of claim 1, wherein the graphical object comprises a plurality of graphical objects and wherein the microprocessor readable and executable instructions further cause the microprocessor to:

identify a first sub-group of graphical objects that are part of the plurality of graphical objects, wherein the first sub-group of graphical objects do not meet the threshold; and zoom in on the first sub-group of graphical objects that do not meet the threshold.

5. The system of claim 4, wherein the plurality of graphical objects comprises a second sub-group of one or more graphical objects and wherein the second sub-group of one or more graphical objects meets the threshold.

6. The system of claim 1, wherein the first confidence score is based on a size of the graphical object and a spell check of text within the graphical object.

7. The system of claim 1, wherein zooming in on the graphical object and zooming out from the graphical object are based on identifying a zoom area that is identified around the graphical object.

8. A method, comprising:

determining, by a microprocessor, a type of user interface for different types of devices capturing, by the microprocessor, a first image of a user interface for one of the different types of devices;

identifying, by the microprocessor, from the first image of the user interface, a graphical object in the user interface;

using, by the microprocessor, a first Artificial Intelligence (AI) process to determine a first confidence score for the graphical object, wherein the first confidence score identifies a confidence of how likely a type of the graphical object can be identified;

selecting, by the microprocessor, the first AI process from a plurality of AI processes based on the type of user interface for the different types of devices;

in response to the first confidence score not meeting a threshold, doing at least one of:

zooming in on the graphical object; and zooming out from the graphical object.

9. The method of claim 8, wherein zooming in on the graphical object is completed and further comprising:

capturing a second image of the user interface, where the captured second image is a zoomed in image of the graphical object;

using the first AI process to determine a second confidence score for the graphical object, wherein the second confidence score identifies a confidence of how likely the graphical object can be properly identified and wherein the second confidence score meets the threshold; and identifying the type of the graphical object.

10. The method of claim 8, wherein zooming out on the graphical object is completed and further comprising:

capturing a second image of the user interface, where the captured second image is a zoomed-out image of the graphical object;

using the first AI process to determine a second confidence score for the graphical object, wherein the second confidence score identifies a confidence of how likely the graphical object can be properly identified and wherein the second confidence score meets the threshold; and identifying the type of the graphical object.

11. The method of claim 8, wherein the graphical object comprises a plurality of graphical objects and further comprising:

identifying a first sub-group of graphical objects that are part of the plurality of graphical objects, wherein the first sub-group of graphical objects do not meet the threshold; and zooming in on the first sub-group of graphical objects that do not meet the threshold.

12. The method of claim 11, wherein the plurality of graphical objects comprises a second sub-group of one or more graphical objects and wherein the second sub-group of one or more graphical objects meets the threshold.

13. The method of claim 8, wherein the first confidence score is based on a size of the graphical object and a spell check of text within the graphical object.

14. The method of claim 8, wherein zooming in on the graphical object and zooming out from the graphical object are based on identifying a zoom area that is identified around the graphical object.

15. A non-transient computer readable medium having stored thereon instructions that cause a microprocessor to execute a method, the method comprising instructions to:

determine a type of user interface for different types of devices;

capture a first image of a user interface for one of the different types of devices;

identify, from the first image of the user interface, a graphical object in the user interface;

use a first Artificial Intelligence (AI) process to determine a first confidence score for the graphical object, wherein the first confidence score identifies a confidence of how likely a type of the graphical object can be identified;

select the first AI process from a plurality of AI processes based on the type of user interface for the different types of devices;

in response to the first confidence score not meeting a threshold, doing at least one of:

zoom in on the graphical object; and zoom out from the graphical object.

16. The non-transient computer readable medium of claim 15, wherein zooming in on the graphical object is completed and wherein the method further comprises instructions to:

capture a second image of the user interface, where the captured second image is a zoomed in image of the graphical object;

use the first AI process to determine a second confidence score for the graphical object, wherein the second confidence score identifies a confidence of how likely the graphical object can be properly identified and wherein the second confidence score meets the threshold; and identify the type of the graphical object.

17. The non-transient computer readable medium of claim 15, wherein zooming out on the graphical object is completed and wherein the method further comprises instructions to:

capture a second image of the user interface, where the captured second image is a zoomed-out image of the graphical object;

use the first AI process to determine a second confidence score for the graphical object, wherein the second confidence score identifies a confidence of how likely the graphical object can be properly identified and wherein the second confidence score meets the threshold; and identify the type of the graphical object.

18. The non-transient computer readable medium of claim 15, wherein the first confidence score is based on a size of the graphical object and a spell check of text within the graphical object.

19. The non-transient computer readable medium of claim 15, wherein the graphical object comprises a plurality of graphical objects and wherein the method further comprises instructions to:

identify a first sub-group of graphical objects that are part of the plurality of graphical objects, wherein the first sub-group of graphical objects do not meet the threshold; and zoom in on the first sub-group of graphical objects that do not meet the threshold.

20. The non-transient computer readable medium of claim 19, wherein the plurality of graphical objects comprises a second sub-group of one or more graphical objects and wherein the second sub-group of one or more graphical objects meets the threshold.

* * * * *